United States Patent [19]

Rall et al.

[11] 4,214,766
[45] Jul. 29, 1980

[54] COLLET

[75] Inventors: Gerhard Rall, Marbach; Hermann L. Kastner, Ludwigsburg, both of Fed. Rep. of Germany

[73] Assignee: Wilhelm Hainbuch GmbH & Co., Marbach, Fed. Rep. of Germany

[21] Appl. No.: 926,299

[22] Filed: Jul. 20, 1978

[30] Foreign Application Priority Data

Jul. 20, 1977 [DE] Fed. Rep. of Germany ....... 2732677

[51] Int. Cl.² ........................................... B23B 31/20
[52] U.S. Cl. .................................. 279/46 R; 279/54; 279/55; 279/58
[58] Field of Search ................... 279/46 R, 55, 51, 58, 279/59, 49, 54

[56] References Cited

U.S. PATENT DOCUMENTS

| 1,017,968 | 2/1912 | Greenleaf | 279/55 |
| 1,827,795 | 10/1931 | Matthews | 279/55 X |
| 2,211,344 | 8/1940 | Montgomery | 279/46 |
| 2,346,706 | 4/1944 | Stoner | 279/46 |
| 2,374,245 | 4/1945 | Stoner | 279/46 |
| 2,817,535 | 12/1957 | Linzell | 279/55 |
| 2,835,496 | 5/1958 | Hall | 279/55 |
| 2,896,954 | 7/1959 | Ernest | 279/54 X |
| 3,539,193 | 11/1970 | Parsons | 279/51 |

FOREIGN PATENT DOCUMENTS

| 539037 | 4/1957 | Canada | 279/58 |
| 1020847 | 12/1957 | Fed. Rep. of Germany | 279/58 |
| 2317829 | 10/1974 | Fed. Rep. of Germany | 279/58 |
| 1371605 | 7/1964 | France | 279/55 |
| 1461073 | 10/1964 | France | 279/55 |
| 566092 | 12/1944 | United Kingdom | 279/58 |
| 584258 | 1/1947 | United Kingdom | 279/58 |
| 656175 | 8/1951 | United Kingdom | 279/55 |
| 751893 | 7/1956 | United Kingdom | 279/58 |
| 1267690 | 3/1972 | United Kingdom | 279/58 |
| 1360614 | 7/1974 | United Kingdom | 279/55 |

OTHER PUBLICATIONS

Advertisement in *Automatic Machining*, Sep. 1975, p. 1, for Sutton Tool Co.
Advertisement in Automatic Machining, Feb. 1976, p. 1, for Sutton Tool Co.
Article in Russian Publication, dated 1940, pp. 15 and 16.

*Primary Examiner*—William R. Briggs
*Attorney, Agent, or Firm*—Schwartz, Jeffery, Schwaab, Mack, Blumenthal & Koch

[57] ABSTRACT

A collet, comprising a clamping head having a front side, having interior gripping surfaces in a longitudinal zone of the clamping head for gripping a workpiece, and having an exterior surface in the form of a frustum located at least partially in the same longitudinal zone as the gripping surfaces and diverging toward the front side of the clamping head, the clamping head being divided into individual gripping jaws, at least in the longitudinal zone of the gripping surfaces, by radially- and axially-extending longitudinal slits circumferentially distributed about the clamping head. The collet includes a clamping tube separately couplable with the clamping head and having means on an end of the clamping tube facing away from the clamping head for fastening the clamping tube to an apparatus for use. Elastic members are provided in the longitudinal slits between the gripping jaws of the clamping head. The clamping head and the clamping tube are coupled together positively in the axial direction and releasably in the radial direction by circumferentially spaced first axial projections on the clamping head and circumferentially spaced second axial projections on the clamping tube. The first and second axial projections are mutually engageable in claw-like fashion. Circumferential groove segments are provided in the engaging first and second axial projections and form a common circumferential groove into which a coupling ring is inserted.

30 Claims, 22 Drawing Figures

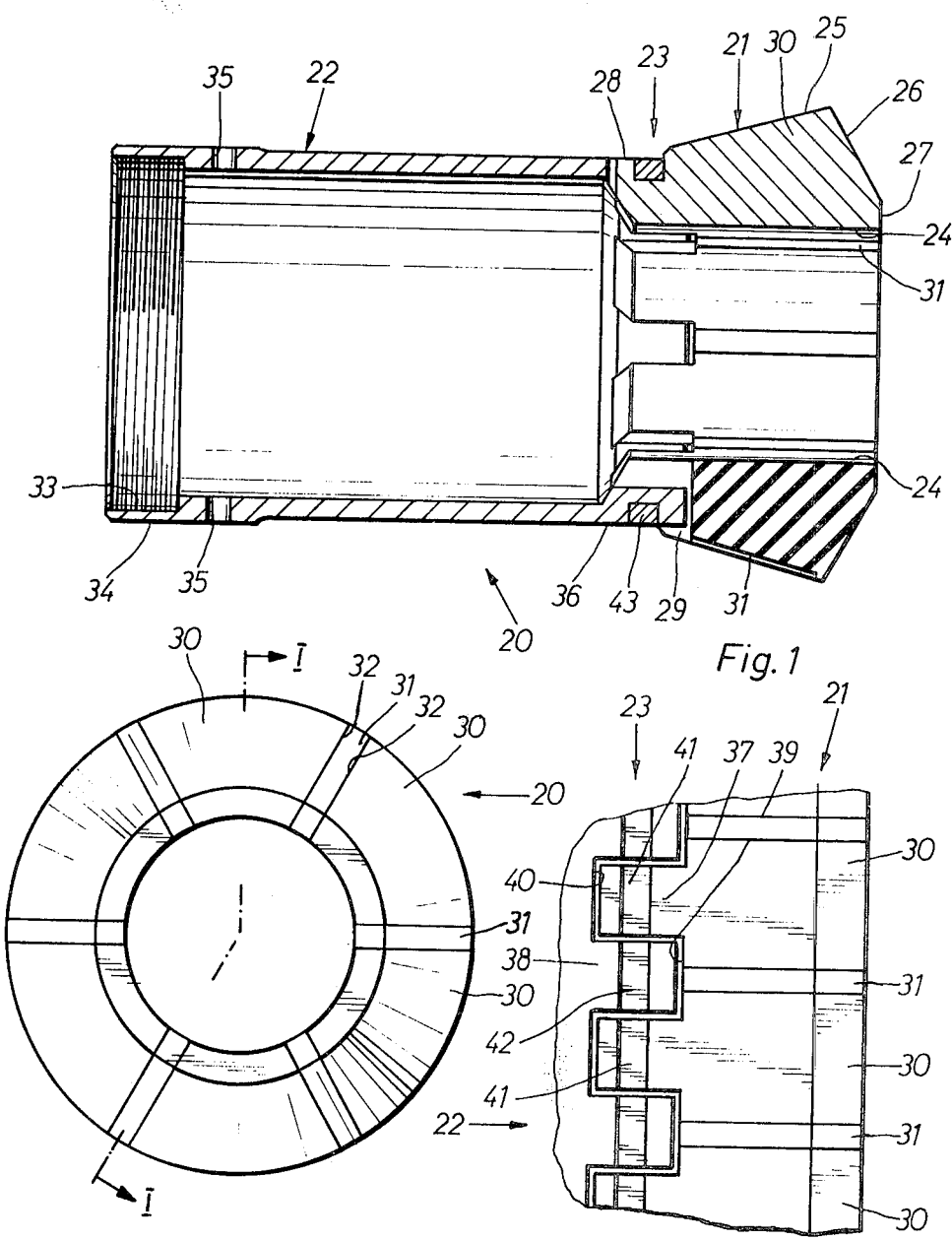

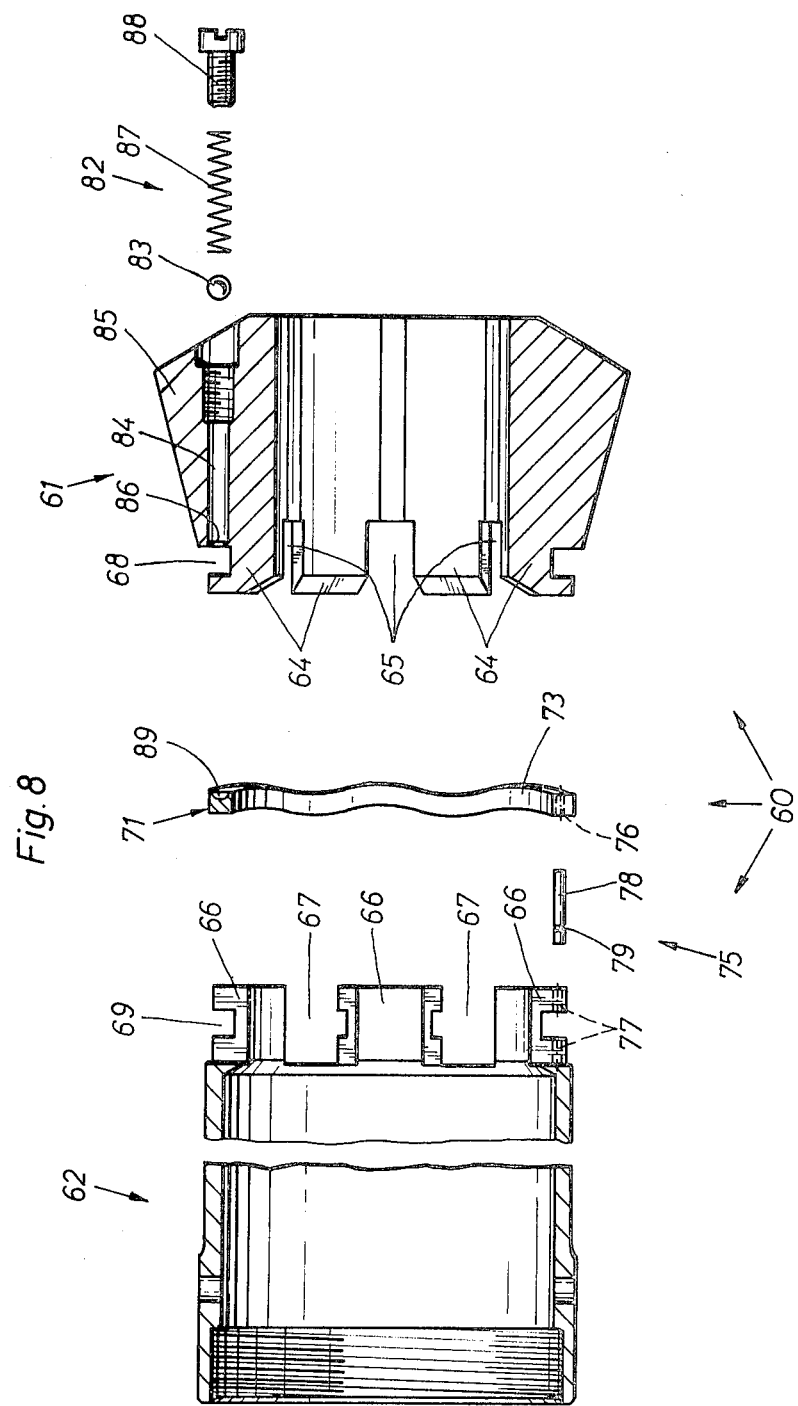

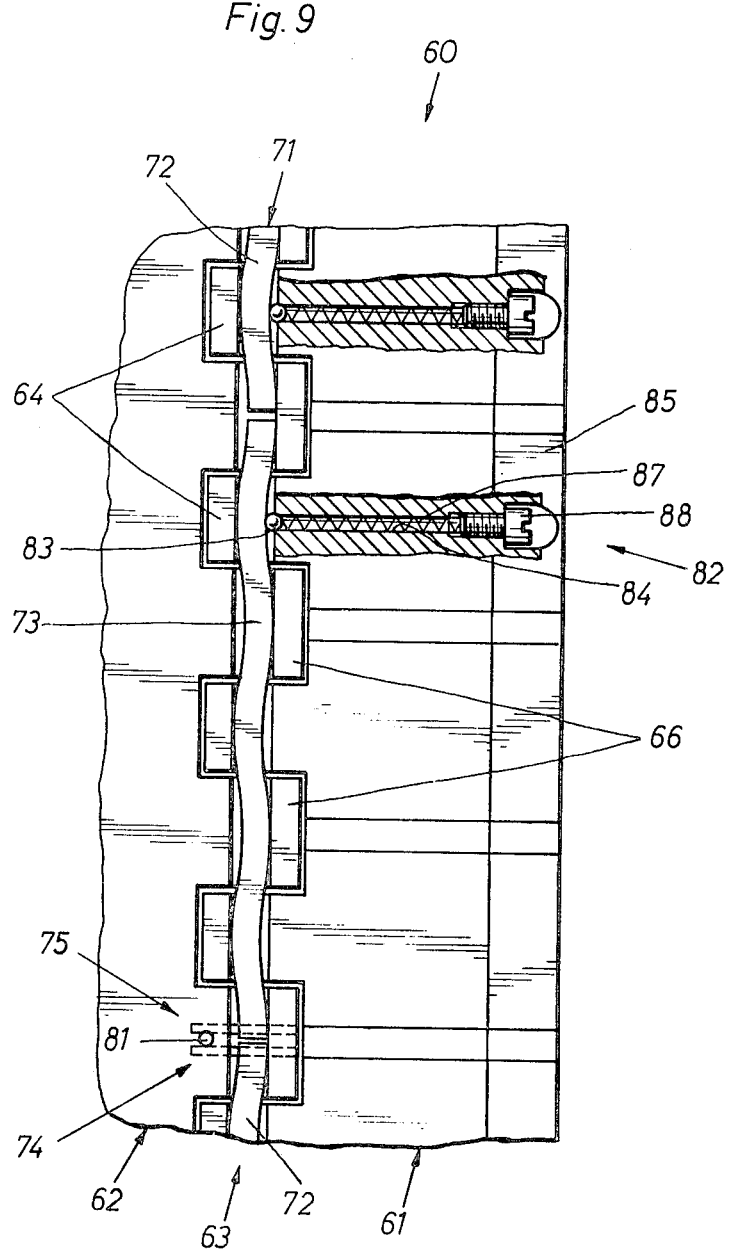

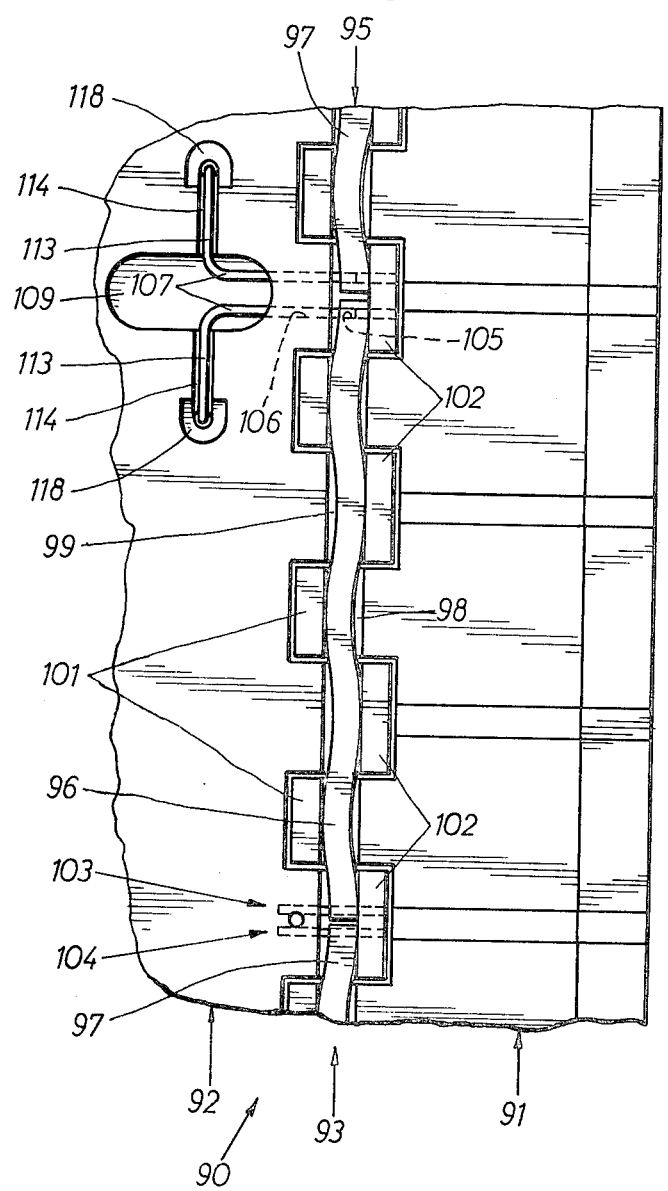

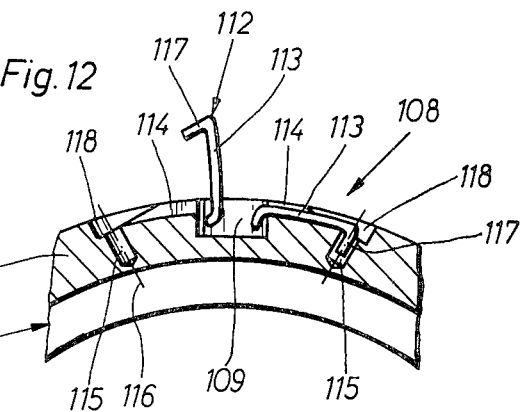
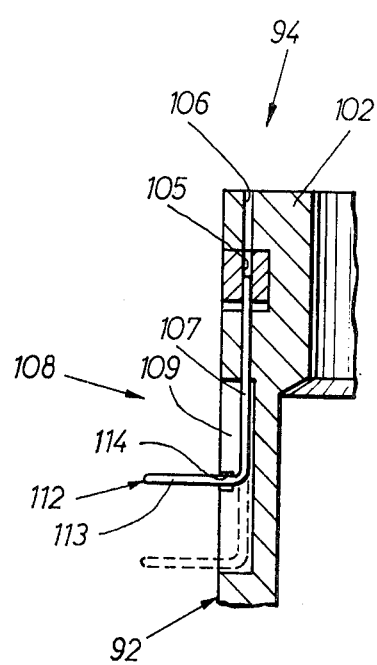
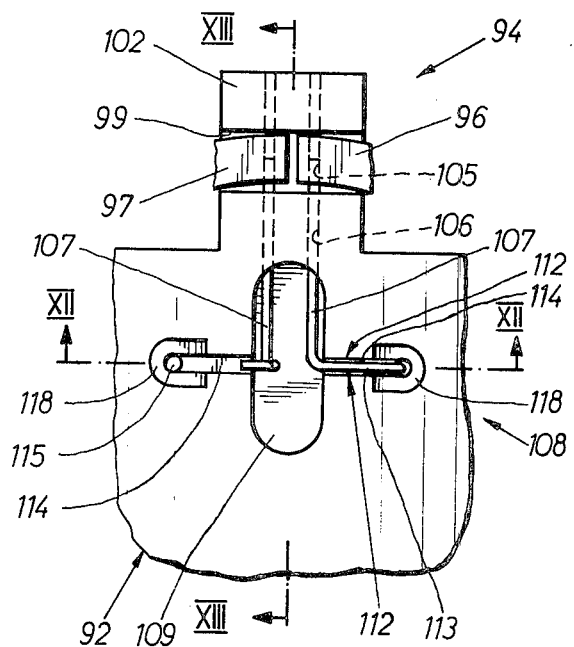

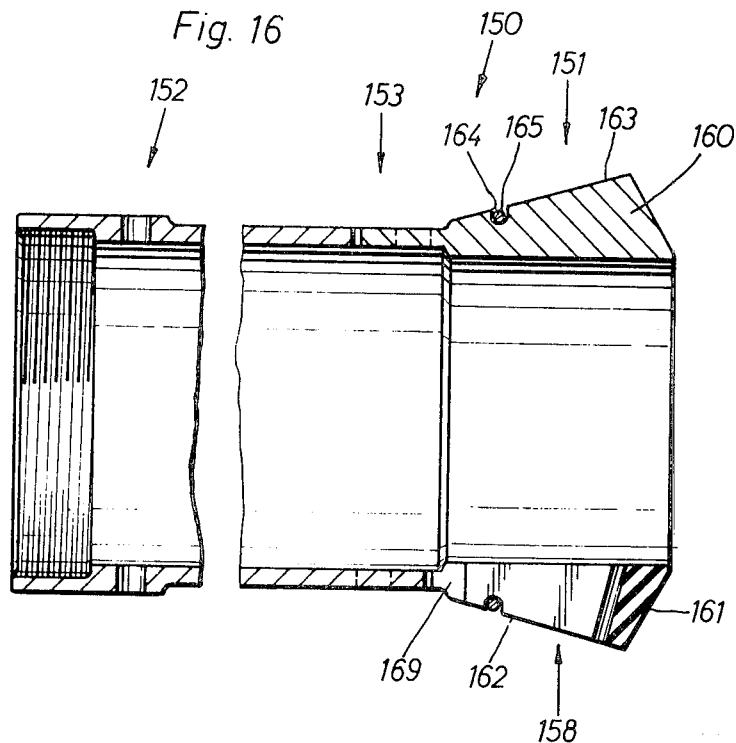
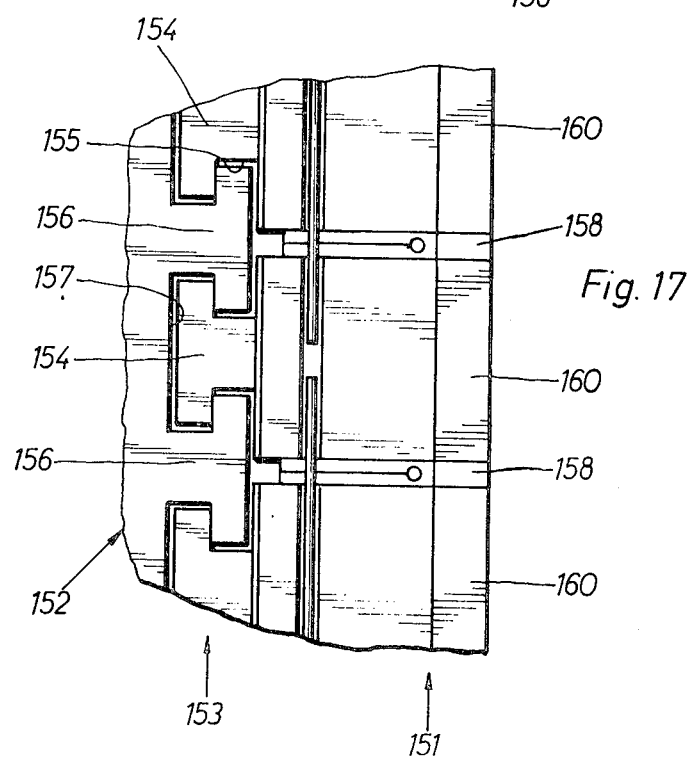

COLLET

BACKGROUND OF THE INVENTION

During the machining of cylindrical workpieces on lathes collets are often used to clamp the workpieces in place. This is true to an even greater extent for the machining of rod material on semi- or fully automatic lathes of single or multiple spidle design. In a large number of such lathes the collets are tightened by means of a tensioning device. On conventional collets suitable for this purpose and made in a single piece, a clamping head part and a clamping tube part may be distinguished. The clamping tube part has on its inner side clamping surfaces for the workpieces and on its outer side an external cone located at least in part in the longitudinal section of the clamping surfaces and diverging in the direction of the free front side facing away from the clamping tube part. The clamping head part is divided into individual gripping jaws by longitudinal slits arranged in a distribution over the circumference and continuous in the radial direction. These longitudinal slits originate at the free front side of the clamping head part and extend in the axial direction through the section of length with the clamping surfaces and the external cone forming the clamping head part proper, through an intermediate section of length which in its original state is of a tubular shape, to a section of length remaining unslit and forming the clamping tube part proper. At the end of the clamping tube part facing away from the clamping head part, a fastening screw thread is provided for the fastening of the collet to the tensioning device of the lathe. The clamping head part in most cases additionally has a circular cylindrical guide surface on its outer side, the external diameter of which is adapted to the internal diameter prevailing in this section of length of the main spindle, in order to guide the rear end of the collet in the radial direction. The intermediate section of length located between the clamping head part proper and the clamping tube part proper, which as a rule has an external diameter smaller than that of the clamping tube part or at least than that of its guide surface, is divided by the longitudinal slits into individual tongues by means of which the gripping jaws of the clamping head part, connected in front with said tongues, may move elastically in and out in the radial direction with respect to the clamping tube part. The tongues are spread to a certain degree so that in the unclamped condition of the collet the internal opening width of the gripping jaws is larger than the nominal diameter, permitting the insertion of the workpieces between the gripping jaws without difficulty.

The hollow main spindle of a lathe has at its front end an internal cone, to which the outer cone of the collets is adapted. The angle of cone of the external cone is usually larger by 10 to 30 angular minutes than that of the inner cone, the external cone thus being somewhat less acute than the inner cone, in order to prevent the jamming of the gripping jaw in the cone. The tensioning device of a lathe generally has a draw tube, which extends from the rear end of the main spindle, into said spindle, to the clamping tube part of the collets. The draw tube is equipped at its front end with a fastening screw thread to which the fastening screw thread on the clamping tube part of the collets is adapted. For use in a lathe, the collet is tightly screwed together with the draw tube and adjusted together with said draw tube with respect to the tensioning device in the axial direction, so that in the release position of the tensioning device the external cone surfaces of the gripping jaws, because of the spread of the tongues, are already in contact with the internal cone of the main spindle, but their internal width is still larger than the nominal diameter and that in the locking position of the tensioning device the internal width of the gripping jaws is reduced to a measure less than the external diameter of the workpieces, while taking into consideration the elastic deformation of the parts.

During the locking or clamping motion the clamping jaws mounted on the front end of the tongues move along an arc and in the process perform a swivel motion. If the workpiece does not exactly conform to its nominal diameter but is over- or undersized, it will be gripped only by the front or rear ends of the gripping surfaces and thus clamped over a relatively small section of its length. The moment generated by this condition at the gripping jaws in general is not capable of deforming the tongues elastically strong enough so that the gripping surfaces of the gripping jaws would contact the workpiece over a larger section of length or possibly over their entire length. Because the tools engage the workpiece outside the clamping location, the danger of the workpiece giving way under the cutting forces increases with the magnitude of the difference between the over-or undersize of the workpiece in relation to the nominal diameter of the collet. Tolerances, particularly tolerances with respect to the diameter, of the workpiece being machined increase to the same degree, together with the danger of the formation of chatter marks on the surface of the workpiece. All of this makes it necessary to space the collets of a set of collets very closely together, leading to a great number of collets and accordingly to high costs of the set. In addition, these conditions also force the observation of low diametrical tolerances of the workpieces and for example in the processing of bar material make it necessary to forego the use of the less expensive as-rolled material in favor of the more expensive drawn or peeled bars. In view of the high stresses to which the gripping jaws are exposed both in the area of the gripping surfaces and of the external cone, where high wear resistance is desired, and also in the area of the spring tongues in the section of length between the clamping head part and the clamping tube part, where high tensile strength and high elasticity are desired, conventional collets are made of a high strength material, generally of a tool steel, which however, is capable of satisfying the various requirements subject to different restrictions only. During the fabrication of the hollow collets, which in most cases are thin-walled, a large part of the material volume of the blank must be machined away. Conventional collets are therefore relatively expensive both with respect to material usage and fabrication costs.

During a change of collets, conventional collets must be drawn out with their entire length from the main spindle, following their unscrewing from the draw tube of the tensioning device. This operation is often impeded by carriages or other devices of the lathe, located in opposing positions and cannot always be facilitated by additional adjustments of such devices.

SUMMARY OF THE INVENTION

It is an object of the invention to provide a collet not afflicted by the disadvantages of conventional collets mentioned hereabove or a collet where said disadvantages exist at least to a lesser degree.

By dividing the collet into two separable parts, only one clamping tube is needed which may be coupled with a clamping head part having fitting configurations of the gripping surfaces and the correct dimensions of said surfaces for the machining of a given workpiece of blank, for an entire set of collets. Such a set of collets, or more accurately a set of clamping head parts, may just as well be equipped with several clamping tube parts, which depending on the available lathes, may be identical or adapted to different lathes, so that several clamping head parts of the set may be used simultaneously on different lathes. Even in the first case, the consumption of material and the cost of fabrication for a set of collets in the conventional sense are reduced to a very considerable degree and in the latter case the advantage is many times greater.

With the collets of the invention, also in the selection of the material the different requirements posed on the one hand in relation to the clamping head part and on the other in relation to the clamping tube part, may be taken into consideration to a greater extent. Separately, the two parts can be machined more readily. The various stages of the fabrication technology, such as case hardening, hardening, tempering, etc., to the extent individually required, may be performed much more simply in separate parts and can be adapted better to the needs of the parts.

Because of the smaller dimensions of the parts of the collets compared with conventional units, the space needed to store an entire set of collets is appreciably less.

When changing collets on a lathe with restricted space, it suffices to advance the draw tube with the collet secured to it in the main spindle only far enough to render the coupling device accessible from the outside so that it can be opened. The clamping head part is then removed and replaced with another.

Due to the yielding of the coupling of the clamping head part in the radial direction with the clamping tube part, the individual gripping jaws of the clamping head part are able to perform a purely radial clamping movement. Their conical outer side is always in contact over its entire length with the inner cone of the main spindle. In this manner, the same clamping force as with conventional collects is obtained with a lower unit pressure between the outer cone surface and the inner cone surface. In addition, this reduces the wear of the conical surfaces. Because of the radial clamping movement of the gripping jaws, their gripping surfaces always remain parallel to the longitudinal axis of the workpiece. The work pieces are thus clamped over the entire length of the gripping surfaces. The giving of the workpieces under the cutting forces is prevented. As the result, diameter tolerances on finished workpieces are smaller, accuracy with respect to roundness is higher and the condition of the surface improved.

The provision of resiliently elastic means between the individual gripping jaws assures the safe spreading of the gripping jaws allowing the release of the collet. Consequently, the angle of cone of the outer cone of the clamping head of the collet can be made equal to the angle of the inner cone of the main spindle, which again benefits the uniform contact of the conical surfaces on each other and of the gripping surfaces with the workpieces over their entire length.

In one form of the collet according to the invention, the resiliently elastic means between the gripping jaws can be installed in a very simple manner. Because they further maintain the individual gripping jaws in their correct mutual correlation, additional measures for this purpose are unnecessary. When the rubber-elastic mass fills in the longitudinal slits at least in their front portions in the vicinity of the free front side of the clamping head part, from the gripping surface to the outer cone, a good sealing effect against the penetration of dirt and foreign bodies, especially of metal chips, is also attained.

Another feature of the collet according to the invention provides a highly adaptable coupling device. With it, the two parts of the collet may be simply inserted in each other and easily connected with each other. In the process, the two parts are secured without additional measures against mutual inadvertent actions, so that for example a retaining moment is transferred to the clamping tube part by a tongue and groove connection between the clamping head part and the main spindle, perhaps to release the collet from the draw tube of the tensioning device. In another feature of the collet according to the invention, the coupling and decoupling of the two parts of the collet is further facilitated.

In still another feature of the collet designed in accordance with the invention, the parts of the coupling ring are always connected with the same part of the collet so that they cannot drop off accidentally during handling and thus be damaged and/or soiled. Similarly, they cannot be mislaid or interchanged with other, possibly ill-fitting, parts. To connect or disconnect the device, the parts of the coupling ring are simply swivelled around, which is very easily performed.

With the collet according to a further form of the invention, it is insured that the parts of the coupling ring always maintain their operating position following the locking of the coupling device. They therefore require, during the handling of the collet, for example during its insertion in the main spindle of a lathe, no special attention or additional operational effort. Various possible embodiments of such a securing device of the parts of the coupling ring are provided; they differ in relation to their material and production costs, the handling effort required and the degree of security afforded, so that selections may be made extensively in keeping with the needs of the individual application. For example, a collet designed according to one form may be chosen particularly in the case of a highly stressed coupling device and high security requirements for the coupling device. The latter is true primarily when the main spindle in the area of the coupling device has a relatively large internal diameter with respect to the external diameter of the collet and thus does not contribute to the securing of the position of the parts of the coupling ring. A modified form of the collet provides a type of automatic security, because in keeping with this embodiment the collet may be inserted in the main spindle of a lathe only when its parts are in a secure condition. A further embodiment reduces the handling effort required in connection with a collet of this type. While yet another embodiment facilitates the opening of the coupling device especially if, in spite of the seals provided, the coupling device becomes soiled.

In a collet designed in keeping with still another form of the invention, high axial yielding of the individual gripping jaws with respect to each other is attained, so that they are able to adapt individually to the diameter of the workpiece existing within their segment of the circumference. As a result even workpieces with high out-of-roundness may be reliably clamped without loss of gripping force. With such a collet, therefore, rolled bar material exhibiting large deviations in relation to cross sectional dimensions and to cross section configuration may be clamped as securely as, for example, drawn bar material. This makes it possible to exploit the not insignificant price advantage enjoyed by rolled bar material. Because all of the gripping jaws participate in the clamping of a workpiece, even if the latter is out-of-round, the axial tensile force of the tensioning device may be made smaller than usual. This reduces the unit pressure between the conical surfaces as well as their wear. Another embodiment of the collet according to the invention insures that the coupling ring is always stressed only in bending and not in shear; this prevents high edge pressures and thus the premature wear of the coupling device.

A further embodiment of the collet provides a coupling device with very low space requirements.

With another form of the collet, it is possible with the aid of a changing device to disengage the clamping head part from the clamping tube part within the main spindle of a lathe and thus change the clamping head part, without having to move the draw tube of the tensioning device, together with the collet attached to it, forward in the main spindle of the lathe until the coupling device is freely accessible and may be opened. Still further, the cooperating parts may be produced particularly simply and inexpensively and further are very readily coupled and uncoupled. In another form of the invention, the gripping jaws perform during the changing of the clamping head part at least an approximate swivelling motion in an axial plane. In the process, the part of the gripping jaws belonging to the coupling device performs an extensively radial motion toward the longitudinal axis, together with the simultaneous mutual approach of said parts of the gripping jaws in the circumferential direction. For the parts of the gripping jaws facing away from this direction, the radial component of the motion progressively decreases with an increasing distance from the coupling device, while the component of the purely swivelling motion increases to the same degree, with the relative change in position in the circumferential direction simultaneously also decreasing. Consequently, the elastic means located between the gripping jaws, especially in their embodiment as a rubber-elastic mass, may be provided with a relatively high spring force in the foward part of the clamping head, so that they are able to furnish the spreading force needed for the opening of the collet without difficulty. In the longitudinal sections of the gripping jaws, having lesser importance for the spreading of the jaws, the elastic means may be designed more yieldingly, in order to facilitate uncoupling. A further embodiment of the collet in keeping with the invention results in a changing device which is very easily handled. Still another embodiment of the collet provides an adjusting device which may be produced very simply and inexpensively and is also readily handled. In the case of a collet designed in accordance a further form, the swivel arms of the activating device are always in contact with the adjusting member, so that the coupling members are always aligned uniformly with respect to each other and therefore may be coupled with the clamping head part without difficulty.

Particularly short tool changing times may be obtained by providing at least two of the changing devices for a set of collets. Then, a changing device may be coupled in advance with the clamping head part to be newly inserted and the activating device may be secured. The clamping head part in the lathe may be uncoupled with the second changing device and then withdrawn from the lathe. Immediately after this, the prepared clamping head part may be inserted with the first changing device.

BRIEF DESCRIPTION OF THE DRAWINGS

Hereafter, the invention will be explained with the aid of the embodiments represented in the drawings. There is shown in:

FIG. 1 a longitudinal section through a first example of embodiment of the collet taken along the line I—I in FIG. 2;

FIG. 2 a front view of the collet according to FIG. 1;

FIG. 3 a partial projection of the collet of FIG. 1 with the coupling ring removed;

FIG. 8 an expanded longitudinal cross section of a second example of embodiment of the collet;

FIG. 9 a partially represented projection of the collet of FIG. 8, sectioned in part;

FIG. 10 a partially represented projection of a third example of embodiment of the collet;

FIG. 11 an enlarged section of the projection of FIG. 10;

FIG. 12 a partially represented cross section of the collet along the line XII—XII in FIG. 11;

FIG. 13 a partially represented cross section of the collet along the line XIII—XIII in FIG. 11;

FIG. 16 a longitudinal cross section of a fifth example of embodiment of the collet;

FIG. 17 a partially represented projection of the collet of FIG. 16;

THE PREFERRED EMBODIMENTS

Figure 4:
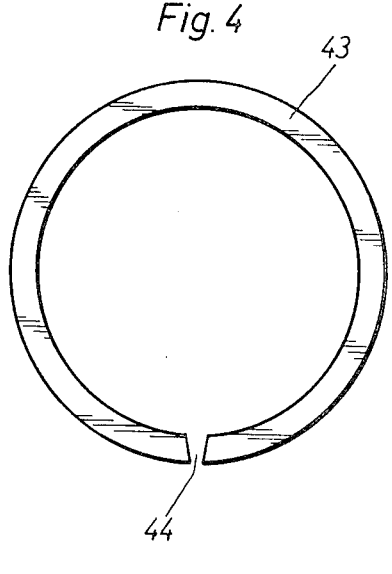
FIG. 4 and 5 a front view each of the first and second example of embodiment of a coupling ring for the collet of FIG. 1.

In the first embodiment shown in FIGS. 1 to 3 the collet 20 has a clamping head part 21, a clamping tube part 22 and a coupling device 23. The clamping head part 21 and the clamping tube part 22 are independent parts which may be separated from each other and which are coupled together by means of the coupling device 23 positively in the axial direction.

The clamping head part 21 has the approximate shape of a hollow cone frustrum. It possesses on its inner side gripping surfaces 24 for the workpieces to be clamped. The gripping surfaces for the most part are circular cylinder surfaces. They may, however, be of other configurations. The gripping surfaces 24 extend from the free front side of the clamping head part 21, to the right in FIG. 1, in the axial direction nearly over the entire length of the clamping head part. The clamping head part 21 exhibits on its external side an outer cone 25 which is diverging toward the free front side of said clamping head and is adapted to the internal cone of the main spindle of the lathe for which the collet 20 is intended. In general, this angle of cone amounts to 30°. The outer cone 25 is shorter in the axial direction than the clamping head 21. A conical transition surface 26 connects with the front end of the outer cone 25, said conical surface having an angle of cone of 150° and extending to the flat front surface 27 on the free front side of the clamping head part 21. A coupling part 28 in the approximate shape of a hollow cylinder connects with the rear end of the outer cone 25, it also represents the rear end of the clamping head part 21.

The clamping head part 21 is divided into individual gripping jaws 30 by longitudinal slits 29, continuous in both the radial and axial directions. In this and the other examples of embodiment of the collet, six longitudinal slits and thus six gripping jaws are always represented. These numbers may, however, be higher or lower just as well. The intervals created by the longitudinal slits 29 between the individual gripping jaws 30 are filled in for the most part by a rubber-elastic mass 31. For this purpose, an elastomer and particularly a crosslinked urethane, proved to be particularly advantageous. As seen in FIG. 1, the rubber-elastic mass 31 extends in the radial direction from the gripping surface 24 to the outer cone 25, and particularly at least into the forward part of the latter, and in the axial direction from the transition surface 26 and the front surface 27 to the coupling part 28. The rubber-elastic mass 31 is applied in a flowable state to the interstitial spaces between the gripping jaws 30 set in a casting mold and is solidified by means of a heat treatment; in this solid state the mass 31 is solidly bonded to the wall surfaces 32 facing each other of the gripping jaws 30. In this manner, the rubber-elastic mass 31 on the one hand maintains the gripping jaws 30 in the clamping head part 21 together and on the other, forms a rubber spring which acts primarily in the circumferential direction upon the gripping jaws and exercises a spreading force on the clamping head part 21, when the latter is released after a clamping process. The clamping tube part 22 of the collet 20 is of a tubular shape over its entire length. At its rear end facing away from the clamping head part 21, tube part 22 has a fastening screw thread 33 to fasten it to the tensioning device of a lathe. In a section of length located in the vicinity of its rear end, the clamping tube part 22 has a cylindrical guide surface 34 on the outside, the external diameter of which is larger than that of the other parts of the clamping tube part and adapted to the internal diameter of the main spindle of the lathe present in this area, in order to provide additional guidance, together with said main spindle, for the collet. Within the area of guide surface 34, two transverse bores 35 are also provided, to which tools may be applied to screw the clamping tube part 22 to the tensioning device of the lathe or conversely to release said clamping tube 22. The coupling part 36 of the clamping tube part 22 is located at the end of the clamping tube part facing away from the fastening screw thread 33 and facing the clamping head part 21.

The coupling part 28 of the clamping head part 21 and the coupling part 36 of the clamping tube part 22 exhibit respective axial extensions 37 and 38 as parts of the coupling device 23 and recesses 39 and 40 in between, which are arranged in a distribution in the circumferential direction and are individually designed so that the extensions 37 and 38 of one of the collet parts 21 and 22 and the recesses 40 and 39 of the other collet part 22 and 21 may engage each other in a claw like manner in the axial direction, as seen particularly in FIG. 3. As further parts of the coupling device 23, respective circumferential groove segments 41 and 42 are provided on the outside of each of the coupling parts 28 of the clamping head part 21 and of the coupling part 36 of the clamping tube part 22. The circumferential groove segments 41 and 42 have rectangular cross sections, and identical diameters and identical width of groove. They are each located in the section of length of the axial extensions 37 and 38, i.e., in the section of length common to the two collet parts 21 and 22 when joined together, in the same plane normal to the longitudinal axis of the collet, so that their circumferential segments are aligned with each other in both of the collet parts in the circumferential direction, as seen in FIG. 3. A coupling ring 43 is placed into the circumferential groove made up of groove segments 41, 42 as an additional part of the coupling device 23, ring 43 being adapted in its cross section, diameter and width to said circumferential groove. In the simplest case, as shown in FIG. 4, the coupling ring 43 is divided at a circumferential location 44 so that it may be spread elastically until it can be pushed onto the clamping tube part 22, with the clamping head part 21 removed. Following the joining together of a clamping head part 21 with the clamping tube part 22, the coupling ring 43 is moved into position in the aligned circumferential groove segments 41, 42 until it engages the circumferential groove, thus positively coupling the two collet parts 21 and 22 in the axial direction. In the radical direction, the gripping jaws 30 of the clamping head part 21 are able to move within certain limits, with respect to the clamping tube part 22, the limits being set primarily by the radial thickness of the coupling ring 43 and the corresponding groove depth of the circumferential groove segments 41, 42 and by the axial tensile force required to achieve a certain clamping force.

The clamping head part 21 and the clamping tube part 22 are made of case hardened steel. The clamping head part 21 is case hardened and hardened in the areas of the gripping surface 24, the external cone 25 and the coupling part 28. The clamping tube part 22 is case hardened and hardened in the area of its coupling part 36. The coupling ring 43 is made of hardenable steel is highly hardened. To the extent that it is customary, or in the area of the coupling device 23 necessary, the areas involved are ground.

The handling of the coupling ring 43 of the coupling device between the clamping head part 21 and the clamping tube part 22 as described above, is facilitated by dividing the coupling ring at two circumferential locations.

Figure 5:
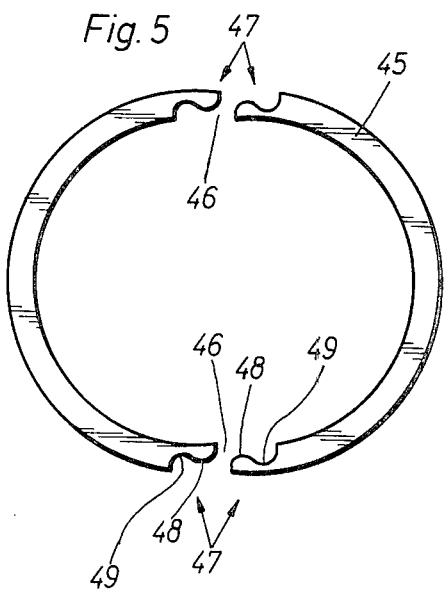

Accordingly, the coupling ring 45 seen in FIG. 5 is divided at two diametrically opposed circumferential locations 46. A position lock 47 is provided for the two halves of the ring lying loosely in the circumferential groove segments 41, 42. Lock 47 is formed by a radial projection 48 and a radial recess 49, located at respective ends, coordinated with each other, of each of the halves of the ring at the circumferential or dividing points 46. When the ring segments are joined, the projections 48 hook into each other and springingly engage the adjacent recesses 49, thus holding the ring halves together.

Figure 6:
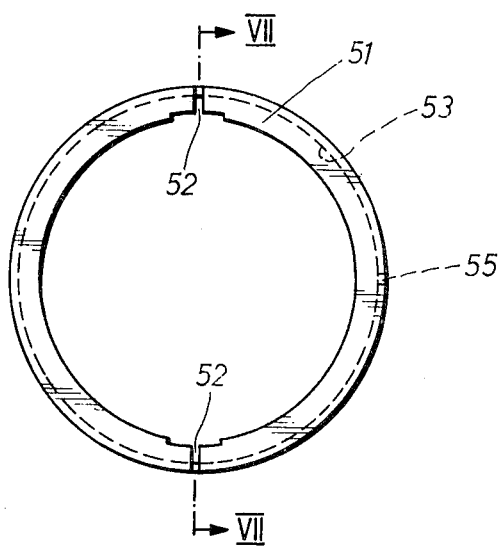
FIG. 6 a front view of a third example of embodiment of the coupling ring for the collet of FIG. 1.
Figure 7:
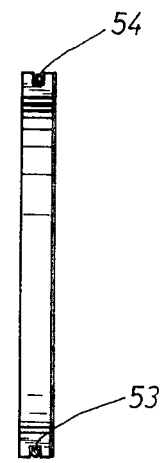
FIG. 7 a cross section of the coupling ring of FIG. 6 taken along the line VII—VII.

FIGS. 6 and 7 display another possible embodiment of a two-part coupling ring 51. This ring is again divided at two diametrically opposed circumferential or dividing locations 52. The ends of the ring halves facing each other here are, in this case, flat. The coupling ring 51 is equipped with a circumferential groove 53 on its circumference into which a springingly elastic snap ring 54 is placed as a position lock, the snap ring being divided at one circumferential location 55 only. The ring holds the two halves of the coupling ring 51 together in the circumferential groove of the coupling device by its spring force.

The second embodiment of the collet seen in FIGS. 8 and 9 differs from the first embodiment merely with respect to the form of the coupling ring and the positional lock of the ring. Whenever the remaining characteristics are not described separately hereafter, reference is made to the corresponding parts of the first described embodiment.

The collet 60 comprises the clamping head part 61 and the clamping tube part 62, which are joined together in the axial direction positively by means of the coupling device 63. The two clamping parts 62 and 63 possess as part of the coupling device 63 at their ends facing each other the axial projections 64 and the recesses 65 in between and the axial projections 66 and the recesses 67 in between, respectively, which hook claw-like into each other in the axial direction. In the section of length common to the two collet parts after they are joined together, as further parts of the coupling device 63, circumferential groove segments 68 are found on the clamping head part 61 and circumferential groove segments 69 inserted as still another part of the coupling device 63 into the circumferential groove made up of groove segments 68, 69.

As seen in FIG. 9, the coupling ring 71 rolled out into a plane is of a wavy configuration. The distance between two adjacent wave crests on the same side is at least approximately equal to the distance between the longitudinal center lines of the adjacent axial projections 64 or 66 respectively, of the corresponding end of the clamping head part 61 or the clamping tube part 62, rolled out into the same plane. The waves of the coupling ring 71 have an internal height which is at least equal, but advantageously slightly larger than the elastic deformation of individual waves resulting from the axial tensile force to be absorbed by the corrugation. This prevents pressure on the edges of the coupling ring. Because of this corrugated form of the coupling ring 71, a positioning lock is provided, which retains the coupling ring 71 in the circumferential direction in that position in which the wave crests on both sides of the coupling ring 71 are always facing the free ends of the projections 64 and 66 and are aligned at least approximately with the longitudinal center lines of the axial projections, as seen in FIG. 9. The coupling ring 71 is divided into the half rings 72 and 73 at two diametrically circumferential or division points. As shown by FIG. 9, these division points are located in a wave crest of the coupling ring 71.

The two half rings 72 and 73 are supported rotatingly at their ends adjacent to each other at a point of division, by means of a swivel hinge 74 and 75, respectively, on the clamping tube part 62, which also fixes the position of their wave crests with respect to the axial projections 64 and 66 in the circumferential direction. The axis of rotation of the two swivel hinges 74 and 75 is aligned parallel to the longitudinal axis of the collet 60. Each of the swivel hinges 74 and 75 is formed by an axially aligned bore 76 in the coupling ring 71 and a bore 77 aligned with bore 76 in one of the projections 66 of the clamping tube part 62 and by a wrist pin 78 inserted into the two bores 76 and 77. A common siding lock is provided for the wrist pins 78 of the swivel hinges 74 and 75. One part of said lock is formed by a circumferential groove 79 applied to each of the wrist pins on their section of length extending into the clamping tube part 62. The other part is formed by a lock pin 81 inserted in a radially aligned bore, arranged on the clamping tube part 62 so that it penetrates the two circumferntial grooves 79 at the wrist pins 78.

By means of the swivel hinges 74 and 75 the two half rings 72 and 73 may be rotated out of their operating position in the aligned circumferential groove segments 68, 69 far enough for the axial projections 64 of the clamping head part 61 to be released by the coupling ring 71 and the clamping head part 61 to be removed from the clamping tube part 62 in the axial direction and replaced by another clamping head part. Subsequently, the two half rings 72 and 73 are rotated back into their operating position and the newly inserted clamping head part coupled with the clamping tube part. By means of the swivel hinges 74 and 75, the half rings 72 and 73 are joined to the clamping tube part 62 and cannot be lost, so that during a change of clamping head part they cannot be mislaid, dirtied during storage or accidentally interchanged.

Because the swivel hinges 74 and 75 can secure the two half rings 72 and 73 only in the circumferential direction and in the radial direction at one end only in the circumferential groove, a farther position lock is provided for the swivelling part of each of the two half rings 72 and 73. Ths lock is in the form of an arresting device 82. The part of the arresting device 82 serving as the locking body is formed by a locking ball 83 inserted in an axially aligned bore 84 in one of the gripping jaws 85 of the clamping head part 61, bore 84 also being aligned with the front surfaces of the circumferential groove segments 68 for the coupling ring 71. A collar 86 is provided at the end of the bore 84 opening into the circumferential groove 68, the internal width of said collar being slightly smaller than the external diameter of the locking ball 83. A helical pressure spring 87 presses the locking ball 83 in the bore 84 against the collar 86 so that part of the locking ball 83 extends from the bore 84 into the circumferential groove 68. The helical pressure spring 87 is supported by a bolt 88, screwed into the bore 84 equipped at its beginning with a screw thread. The other part of the locking device 82 is formed by a conical or spherical segment shaped arresting notch 89, provided in alignment with the bore 84 in the front surface facing bore 84 of the corresponding half ring 73 of the coupling ring 71.

As seen in FIG. 9, the locking device 82 for one half ring 73 is arranged in the freely rotating end of the gripping jaw 85 adjacent to said half ring, approximately in the longitudinal center plane of the gripping jaw, so that the locking ball 83 and the arresting notch a collet with a coupling device as described with reference to FIGS. 8 and 9, having two rotatingly supported coupling half rings, is to be used in a lathe with a very high rotational velocity of the spindle and a correspondingly high centrifugal force effect and/or a main spindle with a large internal width in the range of the coupling ring with respect to the external diameter of said coupling ring, with a correspondingly great freedom of rotation of the half rings within the main spindle, it is advisable to equip the coupling device with a position lock for the half rings, such as shall be described hereafter with the aid of FIGS. 10 to 13. This requires a greater handling effort but yields a higher degree of safety with respect to the locking in position of the half rings of the coupling ring.

The collet 90 with the clamping head part 91, the clamping tube part 92 and the coupling device 93 is largely identical with the collet 60 described in the foregoing, with the exception of the position lock 94. The coupling device 93 has a two-part coupling ring 95 with the two half rings 96 and 97. These are located in a circumferential groove 98 common to the clamping head part 91 and the clamping tube part 92, in the axial projections 101 and 102, respectively. In one of the axial projections 102 of the clamping tube part 92 the two half rings 96 and 97 are rotatingly supported by means of hinges swivel 103 and 104, respectively.

The position lock 94 of the half rings 96 or 97 includes two sets of co-aligned bores 105 and 106, one bore 105 being arranged at the freely rotating end of each of half rings 96 and 97, respectively, and the other bore 106 at that axial projection 102 of the clamping tube part 92 that is located diametrically opposite the swivel hinges 103 and 104. The position lock 94 also includes drop pins 107 which are respectively located in the two sets of bores 105 and 106 between a safety position and a release position pins 107 extend into the bores 105 and 106. In the release position, each pin is located exclusively in the respective bore 106 of the clamping tube part 92 so that the end of the corresponding half ring 96, 97, may be rotated out of the circumferential groove 98, 99.

A sliding rock 108 is provided for each of the two drop pins 107, by means of which the drop pins may be secured in their safety positions and their displacement toward the release position prevented. For this sliding lock 108 and for the handling of the drop pins 107, a recess 109 is provided in the external side of the clamping tube part 92. This recess is positioned in the line of alignment of the bores 106 for the closely adjacent drop pins 107 for the half rings 96 and 97, respectively, of the coupling ring 95. The two bores 106 open freely into this recess 108. The two drop pins 107 extend both in the safety position and in the release position with their rear end in the recess 109, so that they may be gripped there by hand or with a tool and displaced. The drop pins 107 are longer than the axial extent of the recess 109 so that they may be inserted into the bores 106 only with elastic deformation. Conversely, they cannot be removed from the bores 106 without elastic deformation. They cannot be lost, therefore, during the handling of the clamping tube part 92.

The sliding lock 108 for each of the drop pins 107 is shaped in the form of a locking bolt having a locking recess 109. The second recess 114 is only slightly wider than the thickness of the section of length of the drop pin 107 serving as the link slide 112. It is located so that in the safety position of the drop pin 107 the link slide 112 may be snapped into the locking link 111 by a swiveling motion around the longitudinal axis of the safety pin 107.

Even for the purpose of ready handling of the drop pins 107 during their displacement, the angled section of length 113 serving as the link slide is dimensioned long enough so that in its position disengaged from the locking link 111, as illustrated in FIGS. 11 to 13 for the drop pin 107 on the left side, the slide would not fit into the main spindle of a lathe. The collet 90 with the position lock 94 for the two half rings and the side lock 108 for the drop pins 107 of the position lock 94 may therefore be inserted in the main spindle in a generally secured state only. The slide lock 108 can be released initially outside the main spindle only, i.e., the link slide 112 may be disengaged from the locking link 111 and subsequently the position lock 94 released, i.e., a drop pin 107 with the link slide 113 may be displaced from its position shown by a solid line in FIG. 13 into the position shown by a broken line. In order to prevent damage to the link slides 113 of the slide locks 108 during the handling of the collet 90, particularly during the insertion of said collet into the main spindle, the slide links themselves are secured against accidental disengagement. For this purpose, the second recess 114 has its end a depression in the form of a cylindrical bore 115, the longitudinal axis 116 of which proceeds from the beginning of the bore to the bottom of the bore, away from the axial plane of the clamping tube part passing through the beginning of the bore toward the axial plane passing through the drop pin 107 coordinated with it. As a result, its wall section facing the drop pin 107 is undercut with respect to a circular cylinder surface having a cylinder axis aligned with the longitudinal axis of the drop pin 107. In addition, the terminal section 117 of the section of length 113 of the drop pin 107 serving as the link slide is angled in a plane normal to the longitudinal axis of the drop pin in the direction of the bore 115 so that it resiliently engages the undercut of the wall section, as shown particularly in FIG. 12.

The second recess 114 has a U-shaped expansion 118 in the vicinity of the bore 115. It is produced with a slot drill, having its longitudinal axis aligned parallel to the longitudinal axis of the bore 115. This renders the bottom surface of the expansion 118 normal to the bore 115, thus facilitating its subsequent fabrication. In the expansion 118, with a tool, for example the blade of a screwdriver, the underside of the section of length of the drop pin 107 may be reached and its terminal section 117 may thus be readily angled out of the bore 115.

Figure 15:
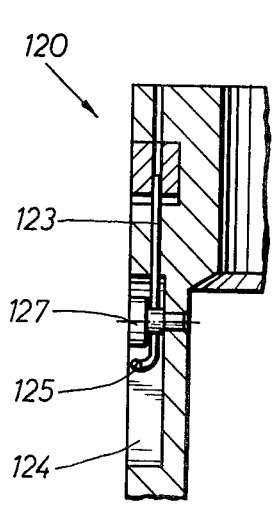
FIG. 15 a partially represented longitudinal cross section of the collet of FIG. 14.
Figure 14:
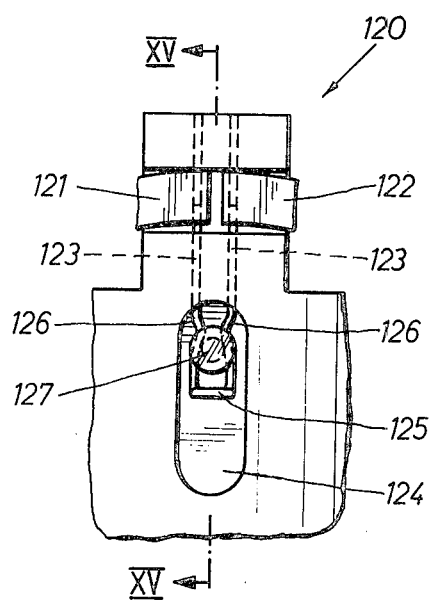
FIG. 14 a partially represented projection of a fourth example of embodiment of the collet.

In the embodiment shown in FIGS. 14 and 15, only the slide lock has been changed with respect to the embodiment of FIGS. 10–13 and otherwise everything is identical or at least similar. The position lock 120 for the two half rings 121 and 122 has two drop pins 123, which are solidly connected with each other by means of a connecting piece 125 at their rear ends extending into the recess 124, i.e., they are shaped in the form of a single piece hair pin. In each section of length serving as a drop pin 123 an inwardly-directed projection 126 is formed. A holding pin 127 is arranged at the bottom of the recess 124 in the path of motion of the two projections 126. The projections 126 contact the holding pin 127 and thus prevent the accidental displacement of the drop pins 123 from the safety position to the release position. In order to effect such a displacement, sufficient force must be brought to bear on the connecting piece 125, to overcome the resistance to deformation of the drop pins 123 and to let the projections 126 deviate elastically. In order to facilitate the application of such a force, the connecting piece 125 is bent upwardly in the outside radial direction, as seen in FIG. 15.

The collet 150 shown in FIGS. 16 and 17 has a clamping head part 151 and a clamping tube part 152, which largely resemble the corresponding parts of collets described earlier. The coupling device 153 between these two parts of the collet has been altered, however. The device includes axial projections 154 arranged in a distribution in the circumferential direction and recesses 155 placed in between at the end of the clamping head part 151 facing the clamping tube part 152, and similar projections 156 with recesses 157 therebetween, at the end of the clamping tube part 152 facing the clamping head part 151, which when rolled out into a plane all have a T-shaped outline. The projections 154 of the clamping head part 151 fit into the recesses 157 of the clamping tube part 152 and, conversely, the projections 156 of the clamping tube head 152 fit into the recesses of the clamping head part 151. Tensile forces are transmitted by means of the adjacent axial front surfaces to the underside of the transverse arms of the T shape facing the web part. This coupling device 153 also transmits torque between the clamping head part 151 and the clamping tube part 152. In the collet 150, the rubber-elastic mass 158 fills the longitudinal slits 159 between the individual gripping jaws 160 of the clamping head part 151 nearly completely. However, it connects the longitudinal slits of the gripping jaws solidly with each other only in the forward area, while the mass is separated in the intermediate and rear 162 areas approximately along the longitudinal center plane. The forward area 161 of the rubber-elastic mass thus forms a rubber hinge, by means of which the rear ends of the gripping jaws 160 with the axial projections 154 may be spread apart and rotated into the recesses 157 of the clamping tube part 152. In the rear half of the external cone surface 163 of the clamping head part 151 a circumferential groove 164 is provided, into which a holding ring 165 is inserted. In the embodiments shown in FIGS. 18 to 22, the collet 170 has a clamping head part 171 and a clamping tube part 172, which are coupled with each other in the axial direction by means of a coupling device 173. These parts of the collet 170 are identical or similar to the corresponding parts of the collet 90 described with the aid of FIGS. 10 to 13, unless stated otherwise hereafter.

The clamping head part 171 differs from the clamping head part 91 by its broader longitudinal slits 174 (FIG. 21) between the gripping jaws 175. As a result, the elastic means in the form of the rubber-elastic mass 176 between the gripping jaws 175 are further extended in the circumferential direction and thus display greter yielding against mutual changes in the positions of the gripping jaws 175. To increase the yielding of rubber-elastic mass 176 especially in the area of the coupling part 177 of the gripping jaws 175, recesses 178 are provided in the rubber-elastic mass from the direction of the end of the clamping head part 171 facing the coupling, which take the shape of voids open toward the rear in the direction of the coupling device. These recesses 178 in general are formed simultaneously with the introduction of the rubber-elastic mass into the longitudinal slit 174. They may, however, be produced later by driling or milling. To prevent the deposition of dirt and chips in the recesses 177, they may be sealed by means of the application of thin walled flexible covers of the same material. Another variation of the clamping head part 171 with respect to the embodiment described heretofore consists of providing each gripping jaw 175 with a cylindrical bore 179 aligned parallel to the to the longitudinal axis of the collet 170, which extends as a blind hole into the gripping jaw from the front side facing away from the coupling part 177, as shown specifically in FIG. 21. These bores 179 are located at the clamping head part 171 on the same diameter of the pitch circle. They serve to receive a changing device 180, by means of which the clamping head part 171 may be uncoupled from the clamping tube part 172 in the main spindle of a lathe, without opening the coupling device 173, and replaced by another clamping head part, possibly one with a different gripping surface diameter or another gripping surface configuration.

The changing device 180 has, for each gripping jaw 175 of the clamping head part 171, a coupling member 181, which is designed in the form of a cylindrical pin. The external diameter of the pin 181 is, at least in the area of the part 182 serving to couple the pin to the clamping head part 171, somewhat smaller than the internal diameter of the bores 179, in order to facilitate equalization of manufacturing tolerances of the bores 179 or the changing device 180 and the coupling of the changing device 180 to the clamping head part 171.

Figure 18:
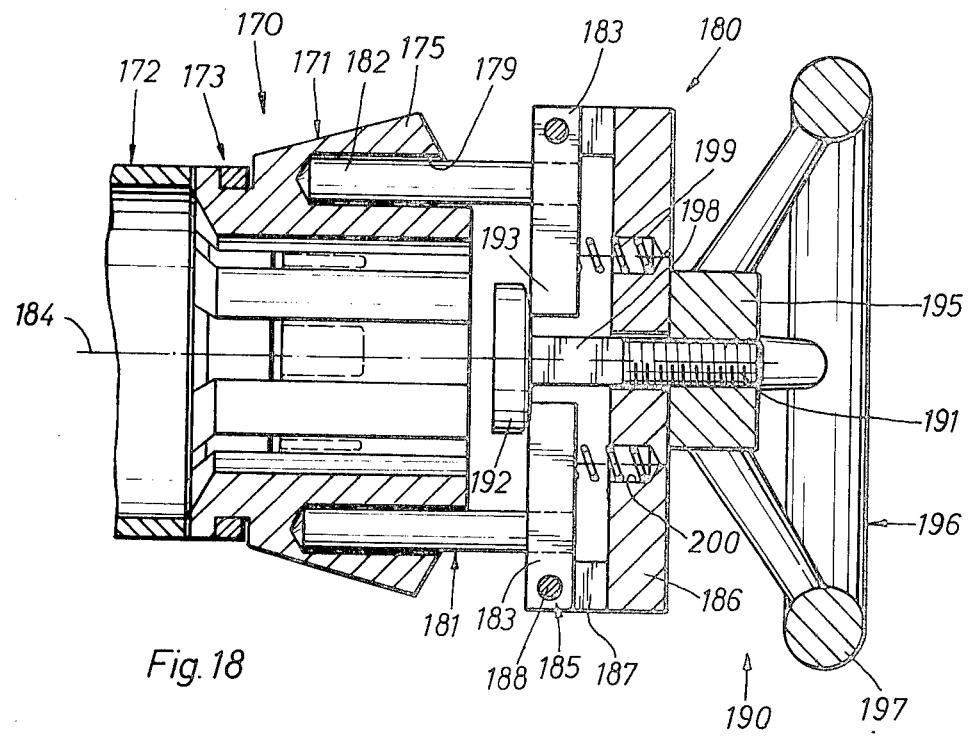
FIG. 18 and FIG. 19 a partially represented longitudinal section of a sixth example of embodiment of the collet with a changing device, in two different operating positions of the changing device and the parts of the collet cooperating with said changing device.

Each coupling member 181 is inserted with its end facing away from its part 182 in a bore of a swivel arm 183, while the coupling member 181 and the swivel arm 183 are solidly joined with each other by means of a press fit mounting. The swivel arms 183 in the released state of the changing device 180 shown in FIG. 18, are aligned at least approximately in the radial direction with respect to the longitudinal axis 184 of the collet 180. Each swivel arm 183 is supported at its end facing away from the longitudinal axis rotatingly on a common pedestal body 186 by means of a hinged joint 185. The pedestal body 186 has the shape of a circular disk. At its front side, the pedestal body displays pairs of pillow blocks 187 in a uniform distribution along the outer rim. The pillow blocks are milled on an initially annular shoulder of the plate shaped pedestal body 186. Each pair of pillow blocks 187 and each swivel arm 183 has a mutually aligned bore into which a hinge pin 188 is inserted as a further part of the hinged joint 185. By means of the connection between the coupling members 181 and the swivel arms 183 the hinged joints 185 also serve as swivel bearings for the coupling members 181.

An activating device 190 is provided for the loading of the changing device 180, i.e. for the inward rotation of the coupling members 181. The swivel arms 183 are one part of the activating device 190. As a further part of the activating device 190 an adjusting member 191 is provided. This member takes the form of a threaded bolt having on one end a circular stop plate 192 for the swivel arms 183. The length of the swivel arms 183 is such that their end facing away from the hinged joint 185 extends into the path of motion of the stop plate 192, so that the adjusting member 191 is able to adjust all of the swivel arms 183 together. As indicated, in FIGS. 18 and 19, the stop plate 192 has a crowned configuration on its side facing the swivel arms 183, so that the swivel arms 183 will not ride on a sharp edge while swiveling. The threaded bolt serving as the adjusting member 191 is inserted in the pedestal body 186 by means of a centered passage 194. On the front side of the pedestal body 186 facing away from the stop plate 192a nut is screwed on, the nut being formed by the body 195 of the hub, equipped with internal threads, of a hand wheel 196. By means of the gear rim 197 of the hand wheel 196, both the activating device 190 and the entire changing device 180 with or without the clamping head part 171, can easily be handled.

Figure 20:
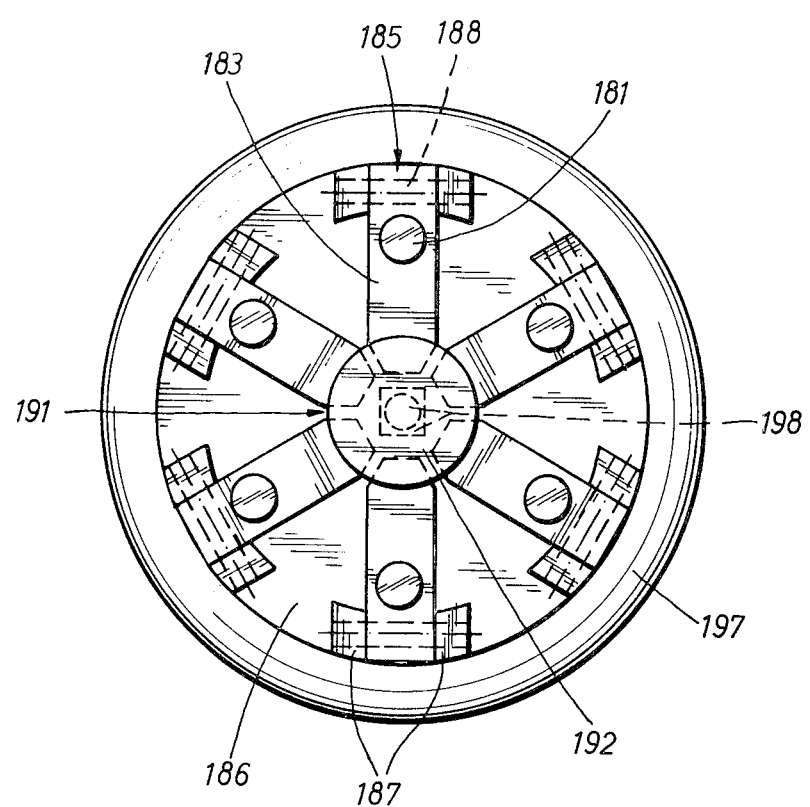
FIG. 20 a front view of the changing device of FIG. 19.
Figure 21:
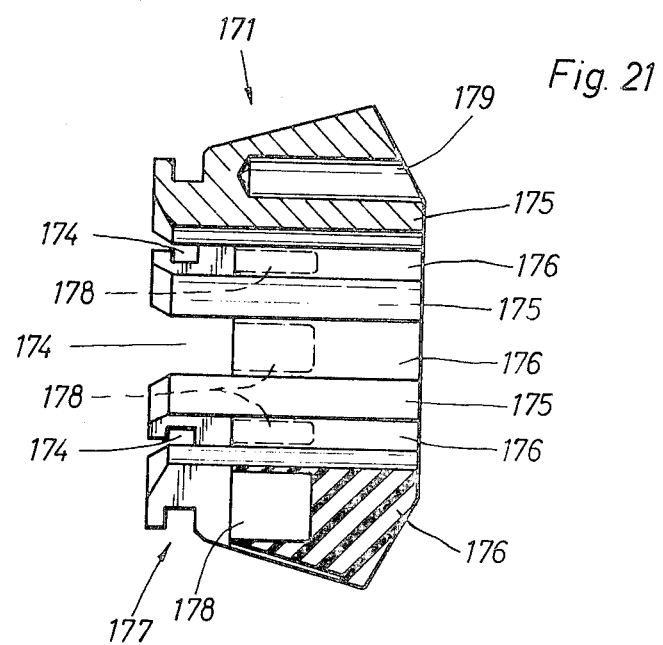
FIG. 21 a longitudinal section through the clamping head part of the collet of FIG. 18 (on a section line corresponding to Line I—I in FIG. 2)
Figure 22:
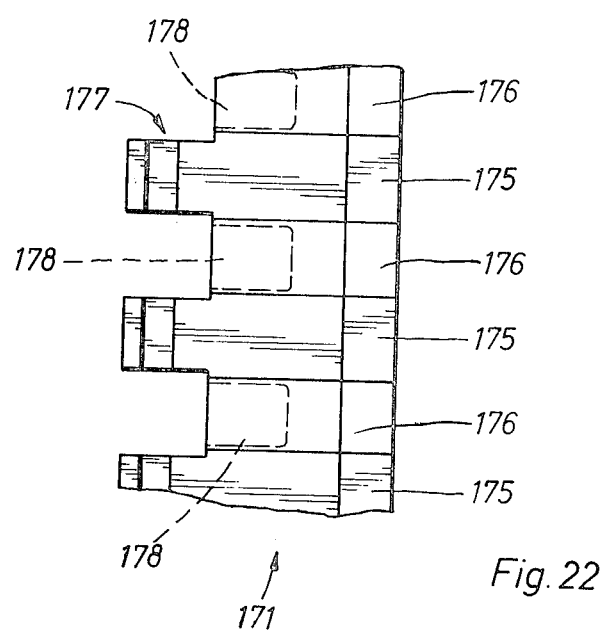
FIG. 22 a partially represented diagram of the clamping head part of FIG. 21.

If the pedestal body 186 be equipped with manual grips, then in place of a manual wheel a wing nut or a lock nut or a nut with a crank arm, may be provided. In order to prevent the rotation of the adjusting part 191 when the hand wheel 196 is being turned, because of unfavorable frictional conditions between the adjusting part 191 and the hand wheel 196, it is convenient to equip the shaft part 198 of the adjusting part 191, which has no threads, with guiding surfaces and to design said shaft for example in a square form, and to correspondingly machine the passage opening in the pedestal body 186 as a square hole, as indicated in FIG. 20.

Figure 19:
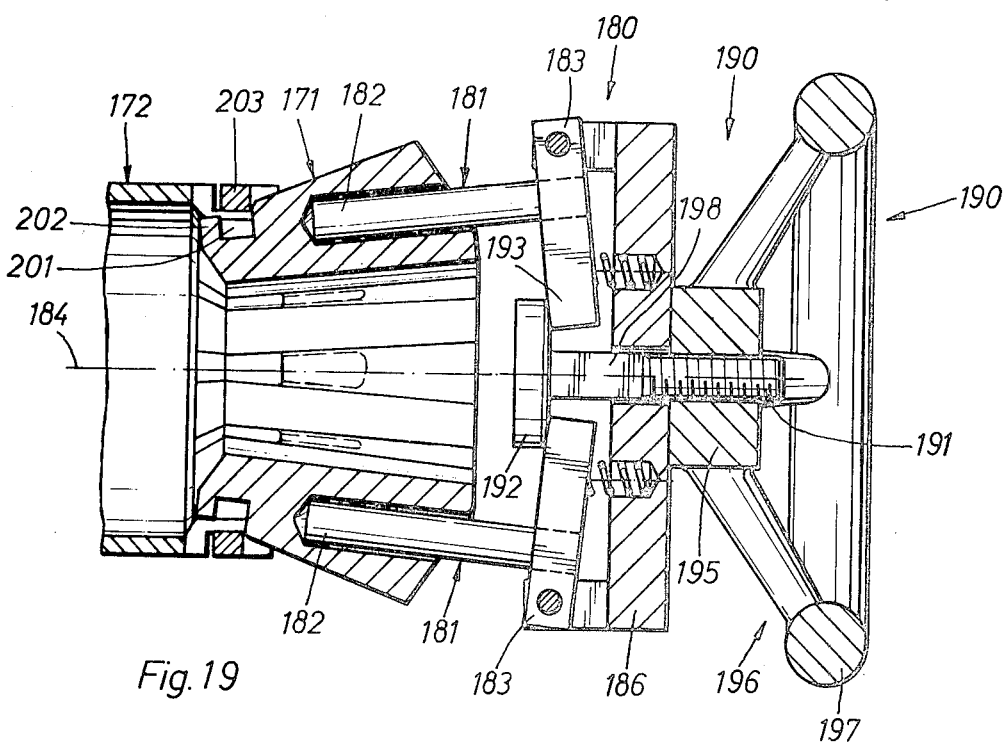

As shown in FIGS. 18 and 19, for each swivel arm 183 and thus for each coupling member 181, an elastic member in the form of a helical compression spring 199 is provided, the spring being supported on one end by its associated swivel arm 183 and on the other by the pedestal body 186. To guide the helical compression springs 199 on the pedestal body 186, they are set with one end in the bores 200, the bores being located on the front side of the pedestal body facing the swivel arms, in an aligned relationship with said swivel arms 183. The springs 199 apply a resetting force to the swivel arms 183 so that their ends 193 are always in contact with the stop plate 192 of the activating device 190. As a result, the coupling members 181 connected with the swivel arms 183, are always aligned uniformly with respect to each other, the force of gravity acting upon them notwithstanding, so that coupling to the clamping head part is facilitated.

In order to change a clamping head part 171, the changing device 190 in its adjusting state shown in FIG. 18, i.e., with coupling members 181 aligned parallel to the longitudinal axis 184 of the collet 170, is set upon the clamping head part 171 so that the coupling members 181 completely engage the bores 179 of the clamping head part. By the turning of the hand wheel 196 the adjusting member 191 is moved to the right, as shown in FIG. 19. In the process, the stop plate 192 of the adjusting member 191 presses the ends 193 of the swivel arms 183 in contact with said stop plate against the pedestal body 186. The rotating motion of the swivel arms 183 also causes the coupling members 181 to rotate, so that primarily their ends 182, farthest from the hinged joints 185, are approaching the longitudinal axis 184 of the collet 170 on a path of motion constituting a circular arc. This motion of approach is continued until the coupling part 177 of the clamping head part 171 is freed, i.e. until the collar 202 located behind the circumferential groove 201 is within the coupling ring 203 in the radial direction. Then, the changing device 180, together with the clamping head part 171, maybe drawn forwardly out of the clamping tube part 172. Conversely, a clamping head part 171 to be newly inserted is gripped outside the lathe in a similar manner by the changing device and brought into the stressed condition shown in FIG. 19. Following this, it may be inserted into the clamping tube part 172 and coupled with the clamping tube part 172 in a stress relieving sense, by the activation of the changing device.

We claim:

1. A collet, comprising:
a clamping head having a front side, having interior gripping surfaces in a longitudinal zone of the clamping head for gripping a workpiece, and having an exterior surface in the form of a frustum located at least partially in the same longitudinal zone as the gripping surfaces and diverging toward the front side of the clamping head, the clamping head being divided into individual gripping jaws, at least in the longitudinal zone of the gripping surfaces, by radially- and axially-extending longitudinal slits circumferentially distributed about the clamping head;
a clamping tube separably couplable with the clamping head and having means on an end of the clamping tube facing away from the clamping head for fastening the clamping tube to an apparatus for use;
elastic means in the longitudinal slits between the gripping jaws of the clamping head; and
means for coupling together the clamping head and the clamping tube positively in the axial direction and releasably in the radial direction, the coupling means comprising circumferentially spaced first axial projections on the clamping head and circumferentially spaced second axial projections on the clamping tube, the first and second axial projections being mutually engageable in claw-like fashion, circumferential groove segments provided in the engaging first and second axial projections and forming a common circumferential groove when the first and second axial projections are mutually engaged, and a coupling ring inserted in the circumferential groove, the coupling ring being divided at at least one circumferential location.

2. A collet according to claim 1, wherein said elastic means comprises a rubber-elastic mass solidly bonded to at least a partial wall surface area of each of the gripping jaws facing each other.

3. A collet according to claim 1, wherein said coupling ring is divided at two diametrically opposed locations to form two coupling ring parts.

4. A collet according to claim 3, further comprising means for pivotably supporting each coupling ring part on the collet, the supporting means comprising a hinged joint having an axis of rotation parallel to a longitudinal axis of the collet.

5. A collet according to claim 4, wherein each hinged joint comprises aligned bores in both a coupling ring part and in a part of the collet, and a hinge pin extending through the two bores.

6. A collet according to claim 5, further comprising a slide lock for the hinge pin, the slide lock comprising a recess formed in a section of the hinge pin extending into the bore in the collet part, a second bore in the collet part aligned with the recess, and a pin member inserted in the second bore to engage the recess.

7. A collet according to claim 3, further comprising a position lock for releasably retaining the coupling ring parts in the circumferential groove.

8. A collet according to claim 7, wherein the position lock comprises at least one projection on one end of each coupling ring part and at least one recess on the other end of each coupling ring part, the projections and recesses being capable of mutually interlocking to retain the coupling ring parts in the circumferential groove.

9. A collet according to claim 7, wherein the coupling ring is provided with a circumferential groove, and wherein the position lock comprises a resiliently elastic fastening ring divided at one circumferential location and inserted in the circumferential groove of the coupling ring.

10. A collet according to claim 7, wherein the position lock comprises an arresting notch located in a surface of the coupling ring, and a resiliently biased arresting body movably guided in a part of the collet into engaging relationship with the arresting notch.

11. A collet according to claim 10, wherein the arresting body comprises a position lock bore opening into the circumferential groove and aligned with the arresting notch in the coupling ring and being at least partially aligned with a longitudinal axis of the clamping head, a ball located in the position lock bore, a compression spring located in the position lock bore urging the ball toward the circumferential groove, and a collar at an end of the position lock bore opening into the circumferential groove, the collar having an internal diameter smaller than an external diameter of the ball.

12. A collet according to claim 7, wherein the position lock comprises a first at least approximately axially oriented bore extending into the coupling ring and a second at least approximately axially oriented bore extending into a part of the collet, the first and second axially oriented bores being coaligned, and a drop pin longitudinally displaceably guided in the second axially oriented bore, between a safety position and release position, the drop pin extending in its safety position into both the first and second axially oriented bores and extending in its release position exclusively in the second axially oriented bore.

13. A collet according to claim 12, further comprising a slide lock for preventing displacement of the drop pin from its safety position to its release position.

14. A collet according to claim 13, wherein the slide lock further comprises a recess opening radially into said part of the collet and into one end of the second axially oriented bore, a portion of the drop pin extending into the recess in both its safety and release positions.

15. A collet according to claim 14, wherein the slide lock comprises an arresting device, comprising a holding pin arranged transversely to and adjacent the drop pin in the radially opening recess, and a projection on said portion of the drop pin for engaging the holding pin.

16. A collet according to claim 14, wherein the slide lock comprises an end section of the drop pin bent at an angle with respect to a main section of the drop pin and located within the radially opening recess, and a transverse recess in an exterior surface of the collet opening into the radially opening recess, the bent end section of the drop pin being capable of releasably snapping into the transverse recess.

17. A collet according to claim 16, wherein the transverse recess includes a depression, a wall surface portion of the depression facing the drop pin having an undercut with respect to a cylindrical surface aligned axially with the main drop pin section, and wherein a terminal section of the drop pin end section is angled into a plane normal to the main drop pin section and in the direction of the depression so that the terminal section resiliently engages the undercut wall surface portion of the depression.

18. A collet according to claim 17, wherein the transverse recess is enlarged in an area adjacent the bent end section of the drop pin to provide access to the bent end section of the drop pin for releasing the resiliently engaged terminal section.

19. A collet according to claim 1, wherein the coupling ring is wave-shaped in the axial direction of the collet, with a circumferential distance between adjacent wave crests being at least approximately equal to the distance between longitidunal center lines of the first axial projections and a circumferential distance between adjacent wave troughs being at least approximately equal to a distance between longitudinal center lines of the second axial projections, and further comprising a position lock for retaining the coupling ring in the circumferential direction in a position in which the wave crests are in at least approximate alignment with the longitudinal center lines of the first axial projections and the wave troughs are in at least approximate alignment with the longitudinal center lines of the second axial projections.

20. A collet according to claim 19, wherein a height between adjacent wave crests and wave troughs is at least equal to an elastic deformation distance of the coupling ring occurring at a maximum operating load.

21. A collet according to claim 1, wherein the first and second axial projections comprise mutually interlocking T-shaped members which, when interlocked, prevent substantial axial motion of the clamping head relative to the clamping tube.

22. A collet according to claim 21, wherein the elastic means forms a hinge for resiliently joining the gripping jaws in a forward portion of the longitudinal slits.

23. A collet according to claim 22, wherein the elastic means is provided with recesses in a longitudinal zone adjacent the coupling means.

24. A collet according to claim 21, wherein each of the gripping jaws is provided with a longitudinal bore extending into the front side for receiving a tool for changing the clamping head.

25. A collet according to claims 1 or 21, further comprising a tool for changing the clamping head, comprising a respective coupling member for each gripping jaw and releasably joinable therewith, each coupling member being movable in an axial plane along a path having a radial component with respect to the collet, the elastic means between the gripping jaws yielding upon movement of the coupling members along said paths to the extent that the gripping jaws may be sufficiently radially displaced at least in the region of the first axial projections to effect uncoupling of the coupling device and permit separation of the clamping head from the clamping tube.

26. A collet according to claim 25, wherein each of the gripping jaws is provided with a longitudinal bore extending into the front side for receiving a respective changing tool coupling member, and wherein each changing tool coupling member comprises a pin insertable in a corresponding gripping bore, the gripping jaw bores having longitudinal axes parallel to a longitudinal axis of the collet when the clamping tube and clamping head are mutually coupled.

27. A collet according to claim 25, wherein the changing tool further comprises a pedestal body on which the coupling members are pivotably supported.

28. A collet according to claim 25, wherein the changing tool further comprises:
- a pedestal body;
- an adjusting member movable along a path with respect to the pedestal body; and
- a swivel arm rigidly joined to each coupling member and pivotable mounted at a respective circumferentially spaced location on the pedestal body, each swivel arm having an end extending into the path of motion of the adjusting member,
- the coupling members being positioned for simultaneously joining with the gripping jaws when the adjusting member is in a first position and the clamping head is coupled with the clamping tube, and the coupling members moving when the adjusting member is moved thereby radially displacing the gripping jaws to effect uncoupling of the coupling device.

29. A collet according to claim 28, wherein the adjusting member comprises a threaded bolt received in a threaded bore of the pedestal body, the threaded bolt having a stop ledge contacting the swivel arm ends.

30. A collet according to claim 29, wherein the changing tool further comprises means for resiliently urging the swivel arm ends against the stop ledge.

* * * * *

United States Patent and Trademark Office

CERTIFICATE OF CORRECTION

PATENT NO. : 4,214,766
DATED : July 29, 1980
INVENTOR(S) : Gerhard RALL and Hermann L. KASTNER It is certified that error appears in the above—identified patent and that said Letters Patent is hereby corrected as shown below:

On the title page, left-hand column, amend the line beginning "[73] Assignee:" by deleting "Wilhelm Hainbuch GmbH u. Co.," and substituting therefor -- Wilhelm Hainbuch GmbH u. Co. Praezisionsspannwerkzeugfabrik, --

Signed and Sealed this

Twenty-eighth Day of October 1980

[SEAL]

Attest:

SIDNEY A. DIAMOND

Attesting Officer

Commissioner of Patents and Trademarks